(12) United States Patent
Read

(10) Patent No.: US 8,300,818 B2
(45) Date of Patent: Oct. 30, 2012

(54) SYSTEM AND METHOD FOR EFFECTIVELY PROTECTING ELECTRONIC CONTENT INFORMATION

(75) Inventor: Christopher Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1061 days.

(21) Appl. No.: 11/711,381

(22) Filed: Feb. 27, 2007

(65) Prior Publication Data
US 2008/0205656 A1    Aug. 28, 2008

(51) Int. Cl.
G06F 3/14   (2006.01)
G06F 13/10  (2006.01)

(52) U.S. Cl. ............. 380/211; 380/33; 713/168; 726/28
(58) Field of Classification Search .................. None
See application file for complete search history.

(56) References Cited

U.S. PATENT DOCUMENTS

| | | | |
|---|---|---|---|
| 6,272,631 B1 | 8/2001 | Thomlinson et al. | |
| 7,185,195 B2* | 2/2007 | Hug et al. | 713/156 |
| 7,266,660 B2* | 9/2007 | Peinado | 711/163 |
| 7,328,276 B2* | 2/2008 | Alisuag | 709/237 |
| 7,634,734 B2* | 12/2009 | Fuller et al. | 715/741 |
| 2002/0112161 A1 | 8/2002 | Thomas et al. | |
| 2003/0135730 A1* | 7/2003 | Szucs et al. | 713/153 |
| 2003/0236978 A1* | 12/2003 | Evans et al. | 713/164 |
| 2004/0010717 A1* | 1/2004 | Simec et al. | 713/201 |
| 2004/0162786 A1 | 8/2004 | Cross et al. | |
| 2005/0078822 A1* | 4/2005 | Shavit et al. | 380/201 |
| 2005/0120125 A1* | 6/2005 | Morten et al. | 709/231 |
| 2006/0282899 A1* | 12/2006 | Raciborski | 726/26 |
| 2007/0050853 A1* | 3/2007 | Rhim | 726/27 |
| 2007/0088947 A1* | 4/2007 | Cross et al. | 713/165 |

OTHER PUBLICATIONS

Serrao et al. Open SDRM—An Open and Secure Digital Rights Management Solution. IADIS'03[online], [retrieved on Jun. 22, 2010]. Retrieved from the Internet, IEEE.*

* cited by examiner

*Primary Examiner* — Venkat Perungavoor
(74) *Attorney, Agent, or Firm* — Gregory J. Koerner; Redwood Patent Law

(57) ABSTRACT

A system and method for effectively protecting electronic content information includes a channel setup module that coordinates a channel setup procedure to create a secure communications channel between a content drive and a display module. A source DRM module transmits a special content key from the content drive to the display module over the secure communications channel. A content playback module then initiates a content playback procedure for utilizing the electronic content. The source DRM module responsively encrypts the electronic content with the content key. The channel setup module and the content playback module are unable to access or utilize the content key. A destination DRM module then receives the electronic content over the secure communications channel and utilizes the content key to decrypt the electronic content.

3 Claims, 9 Drawing Sheets

SYSTEM AND METHOD FOR EFFECTIVELY PROTECTING ELECTRONIC CONTENT INFORMATION

BACKGROUND SECTION

1. Field of Invention

This invention relates generally to techniques for utilizing electronic information, and relates more particularly to a system and method for effectively protecting electronic content information.

2. Description of the Background Art

Implementing effective methods for protecting electronic information is a significant consideration for designers and manufacturers of contemporary electronic devices. However, effectively protecting electronic information may create substantial challenges for device designers. For example, enhanced demands for effective protection of electronic content may require more system processing power and require additional hardware or software resources. An increase in processing or software requirements may also result in a corresponding detrimental economic impact due to increased production costs and operational inefficiencies.

Furthermore, enhanced device capabilities to perform various advanced content protection operations may provide additional benefits to content owners, but may also place increased demands on the control and management of various system components. For example, an enhanced electronic device that effectively and securely protects various types of image data may benefit from an efficient implementation because of the large amount and complexity of the digital data involved. In addition, effectively protecting electronic content may also provide significant financial value to the owners of the particular electronic content.

Due to growing demands on system resources, the significant financial value of content information, and substantially increasing data magnitudes, it is apparent that developing new techniques for protecting and utilizing electronic information is a matter of concern for related electronic technologies. Therefore, for all the foregoing reasons, developing effective techniques for securely protecting electronic information remains a significant consideration for designers, manufacturers, and users of contemporary electronic devices.

SUMMARY

In accordance with the present invention, a system and method for effectively protecting electronic content is disclosed. In one embodiment of the invention, a system user may initially select a content drive for reproducing proprietary electronic content upon a display of a host electronic device. A content playback module of the host electronic device may read appropriate types of metadata that are provided in an unencrypted state (in-the-clear) from a source DRM module of the content drive. This metadata may be utilized to support various types of enhanced functionalities for the optimal utilization of the electronic content.

The channel setup module then performs a secure channel setup procedure to create a secure communications channel between the content drive and the display module by utilizing any appropriate and effective techniques. In certain embodiments, the secure channel setup procedure may include a Diffie-Hellman exchange procedure in which several initial identification keys are exchanged in appropriate handshaking procedures to identify and validate both the content drive and the display module.

In certain embodiments, the source DRM module may request an electronic identification certificate from a destination DRM module of the display module to validate the identity and characteristics of the display module. In accordance with the present invention, after the secure communications channel is opened and the electronic identification certificate of the display module is validated, the source DRM module may then generate and send one or more special content keys to the destination DRM module for decoding electronic content transferred from the content drive to the display module during a current content transfer session.

In accordance with the present invention, the source DRM module may then encrypt the electronic content from the content drive by utilizing the content key(s) that were previously provided to the destination DRM module over the secure communications channel. The content playback module may next access the content drive to read and transfer the encrypted electronic content to the display module over the secure communications channel. In accordance with the present invention, neither the channel setup module nor the content playback module are able to access or utilize the content key to decrypt the electronic content.

The destination DRM module may responsively decrypt the received electronic content with the content key(s) previously received from the source DRM module over the secure communications channel. The display module may then display the decrypted electronic content in combination with any associated metadata upon the display of the host electronic device. For at least the foregoing reasons, the present invention therefore provides an improved system and method for effectively protecting electronic content information.

DETAILED DESCRIPTION

The present invention relates to an improvement in Digital Rights Management (DRM) systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively protecting electronic content information, and includes a channel setup module that coordinates a channel setup procedure to create a secure communications channel between a content drive and a display module. A source DRM module transmits a special content key from the content drive to the display module over the secure communications channel. A content playback module then initiates a content playback procedure for utilizing the electronic content. The source DRM module responsively encrypts the electronic content with the content key. The channel setup module and the content playback module are unable to access or utilize the content key. A destination DRM module then receives the electronic content over the secure communications channel and utilizes the content key to decrypt the electronic content. Note that any other software modules or snooping techniques designed to utilize the protected content without authorization will not be able to access the content key, and thus will not be able to utilize the content.

Figure 1:
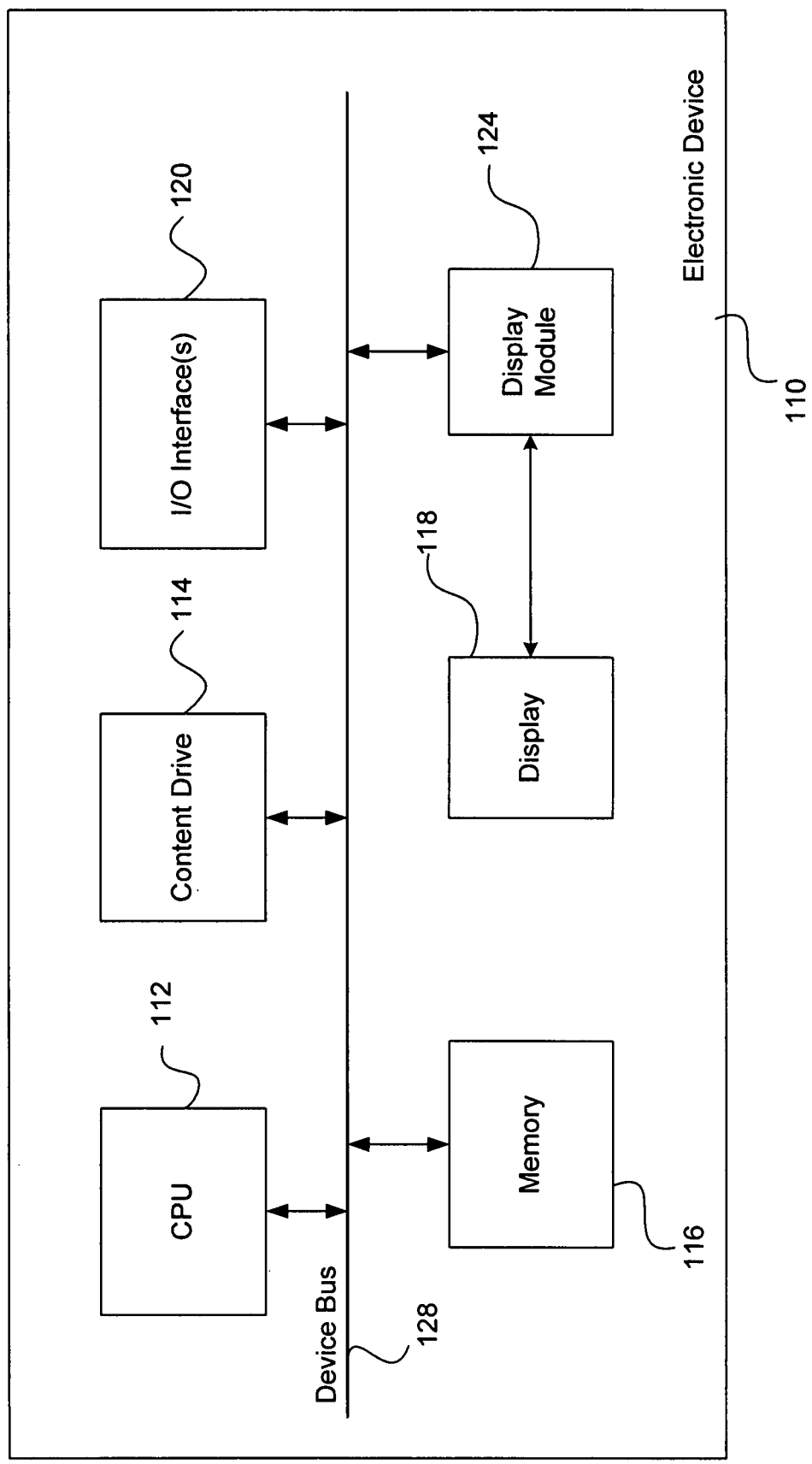
FIG. 1 is a block diagram for one embodiment of an electronic device, in accordance with the present invention.

Referring now to FIG. 1, a block diagram for one embodiment of an electronic device 110 is shown, in accordance with the present invention. In the FIG. 1 embodiment, electronic device 110 includes, but is not limited to, a central processing unit (CPU) 112, a content drive 114, a memory 116, a display 118, input/output interface(s) (I/O interface(s)) 120, and a display module 124. The foregoing components of electronic device 110 may be coupled to, and communicate through, a device bus 128.

In various embodiments, electronic device 110 may be implemented as any appropriate type of electronic device or system. For example, electronic device 110 may be implemented as a computer device, a video camera, a television settop box, a cellular telephone, or a personal digital assistant (PDA) device. In addition, electronic device 110 may be implemented using components and configurations in addition to, or instead of, certain of those components and configurations discussed below in conjunction with the FIG. 1 embodiment.

In various embodiments, electronic device 110 may be implemented as a closed system where no hardware may be added or removed, or as an open system, such as a desktop PC, where hardware and/or software components may be added or removed, including those intended to steal DRM protected content.

In the FIG. 1 embodiment, CPU 112 may be implemented to include any appropriate and compatible processor device that executes software instructions to control and manage the operations of electronic device 110. The FIG. 1 display 118 may include any effective type of display technology including a cathode-ray-tube monitor or a liquid-crystal display device. In the FIG. 1 embodiment, I/O interface(s) 120 may include one or more input and/or output interfaces to receive and/or transmit any required types of information to or from electronic device 110.

In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. In the FIG. 1 embodiment, content drive 114 may be utilized to provide various types of electronic content to display module 124 over a secure channel for reproduction on display 118. Additional details regarding the functionality and implementation of content drive 114 and display module 124 are further discussed below in conjunction with FIGS. 3 and 4.

Figure 2:
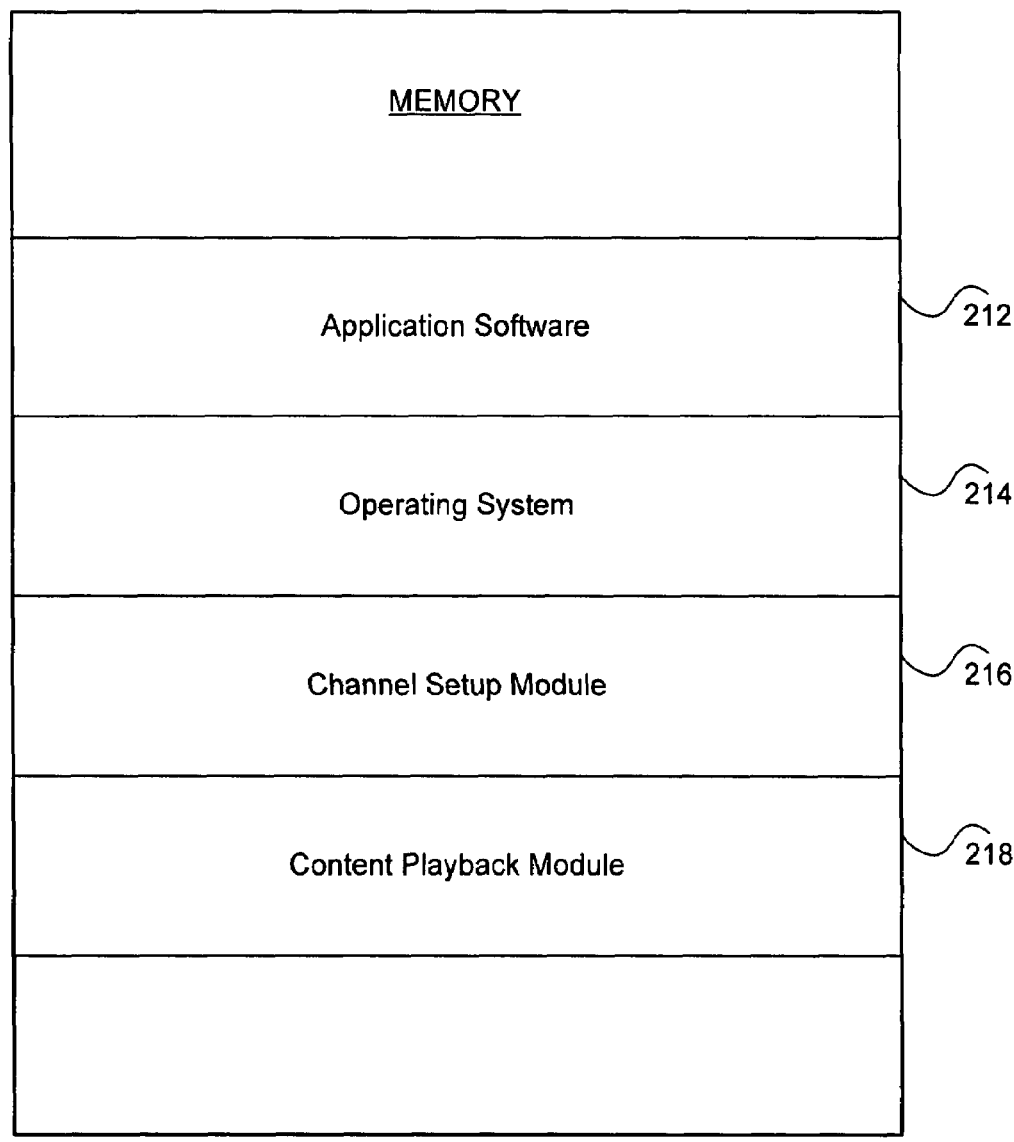
FIG. 2 is a block diagram for one embodiment of the memory of FIG. 1, in accordance with the present invention.

Referring now to FIG. 2, a block diagram of the FIG. 1 memory 116 is shown, in accordance with one embodiment of the present invention. In the FIG. 2 embodiment, memory 116 includes, but is not limited to, application software 212, an operating system 214, a channel setup module 216, and a content playback module 218. In alternate embodiments, memory 116 may be implemented using components and configurations in addition to, or instead of, certain of those components and configurations discussed in conjunction with the FIG. 2 embodiment.

In the FIG. 2 embodiment, application software 212 may include program instructions that are preferably executed by CPU 112 (FIG. 1) to perform various functions and operations for electronic device 110. The particular nature and functionality of application software 212 typically varies depending upon factors such as the specific type and particular use of the corresponding electronic device 110. In the FIG. 2 embodiment, operating system 214 controls and coordinates low-level functionality of electronic device 110.

In the FIG. 2 embodiment, electronic device 110 may utilize channel setup module 216 for creating a secure communications channel between content drive 114 and display module 124, as discussed above in conjunction with FIG. 1. In addition, electronic device 110 may utilize content playback module 218 for providing encrypted content information from content drive 114 to display module 124 for presentation on display 118 (FIG. 1). In the FIG. 2 embodiment, application software 212, operating system 214, channel setup module 216, and content playback module 218 may be implemented as software programs that utilize any appropriate and effective techniques, formats, or standards.

For example, in certain embodiments, channel setup module 216 and content playback module 218 may be implemented as Open Source software programs that comply with a known Open Source standard that requires non-proprietary and public access to source code and other information from the compliant software programs and corresponding host electronic devices. Alternately, application software 212, operating system 214, channel setup module 216, and content playback module 218 may be implemented as proprietary commercial software programs that are not Open Source compliant. The effective utilization of channel setup module 216 and content playback module is further discussed below in conjunction with FIG. 5 through FIG. 7B.

Figure 3:
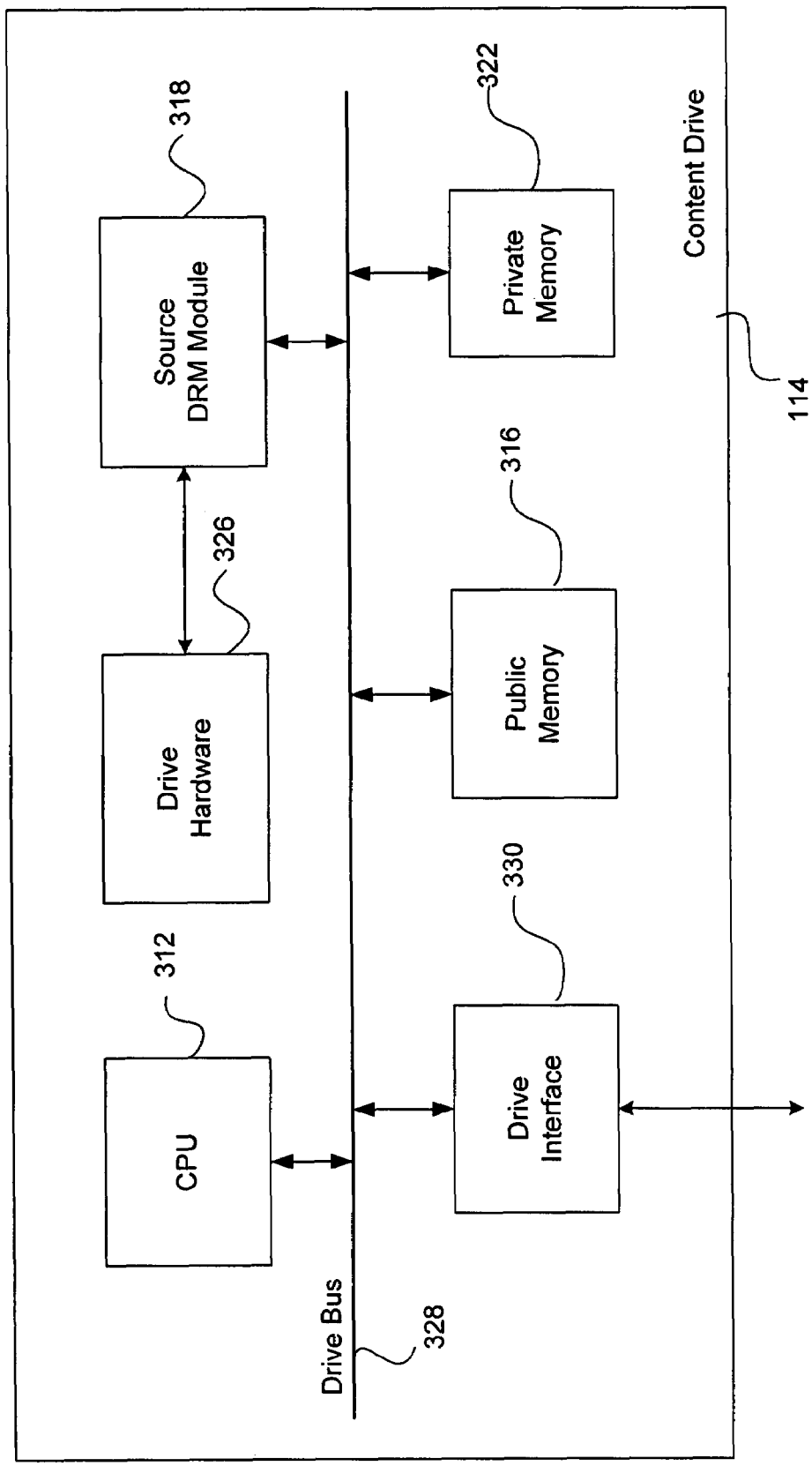
FIG. 3 is a block diagram for one embodiment of the content drive of FIG. 1, in accordance with the present invention.

Referring now to FIG. 3, a block diagram of the FIG. 1 content drive 114 is shown, in accordance with one embodiment of the present invention. In the FIG. 3 embodiment, content drive 114 includes, but is not limited to, a CPU 412, a public memory 316, a source DRM module 318, a private memory 322, drive hardware 326, and a drive interface 330. In alternate embodiments, content drive 114 may be implemented using components and configurations in addition to, or instead of, certain of those components and configurations discussed in conjunction with the FIG. 3 embodiment.

In the FIG. 3 embodiment, content drive 114 may be configured to provide electronic content for presentation on display 118 by utilizing any effective techniques or methods. For example, in certain embodiments, content drive 114 may read the electronic content from non-volatile storage media such as magnetic tape, flash memory, CDs, DVDs, or Blu-ray discs. In other embodiments, content drive 114 may receive the electronic content from an external content source such as a hardwired or wireless transmission from the Internet, a cable broadcast provider, or other networked content source.

In the FIG. 3 embodiment, the electronic content information may include any appropriate types of electronic information. For example, the electronic content information may include, but is not limited to, entertainment programming, movies, video data, audio data, digital photographs, still image data, graphics, web pages, program guide information, video games, and various types of software programs, etc. Referring again to FIG. 1, content drive 114 is shown as part of electronic device 110. However, in certain alternate embodiments, content drive 114 may be implemented in a manner that is external to electronic device 110.

In the FIG. 3 embodiment, CPU 312 may be implemented to include any appropriate and compatible processor device that executes software instructions to control and manage the operations of content drive 114. In the FIG. 3 embodiment, public memory 316 may be implemented to include any combination of desired storage devices, including, but not limited to, read-only memory (ROM), random-access memory (RAM), and various types of non-volatile memory, such as CDs, DVDs, Blu-ray discs or hard disks. In the FIG. 3 embodiment, content drive 114 utilizes public memory 316 to store public information that may be accessed by any desired external entities. For example, electronic device 110 may access the contents of public memory 316 with application software 212, operating system 214, channel setup module 216, or content playback module 218 (FIG. 2).

In the FIG. 3 embodiment, content drive 114 may advantageously utilize source DRM module 318 to perform a content encryption procedure upon electronic content read by drive hardware 326 before transmitting the encrypted content to a display module 124 (FIG. 1) for presentation on a display 118 of the electronic device 110. In the FIG. 3 embodiment, source DRM module 318 may perform the content encryption procedure by utilizing any appropriate and effective encryption techniques or methods. For example, in certain embodiments, source DRM module 318 generates one or more special content keys that define specifically how the electronic content is altered during the content encryption procedure.

In the FIG. 3 embodiment, private memory 322 may be implemented to include any combination of desired storage devices, including, but not limited to, read-only memory (ROM), random-access memory (RAM), and various types of non-volatile memory, such as CDs, DVDs, Blu-ray discs or hard disks. In the FIG. 3 embodiment, content drive 114 utilizes private memory 322 to securely store private information that may be accessed only by certain authorized external entities. For example, in the FIG. 3 embodiment, the contents of private memory 322 may not accessed by application software 212, operating system 214, channel setup module 216, or content playback module 218 of electronic device 110. In the FIG. 3 embodiment, content drive 114 may utilize private memory 322 for performing the foregoing content encryption procedure. In the FIG. 3 embodiment, content drive 114 may utilize drive interface 330 to bi-directionally communicate with device bus 128 of electronic device 110 (FIG. 1). Additional details for effectively utilizing source DRM module 318 to securely protect transferred electronic content are further discussed below in conjunction with FIGS. 5 through 7B.

Figure 4:
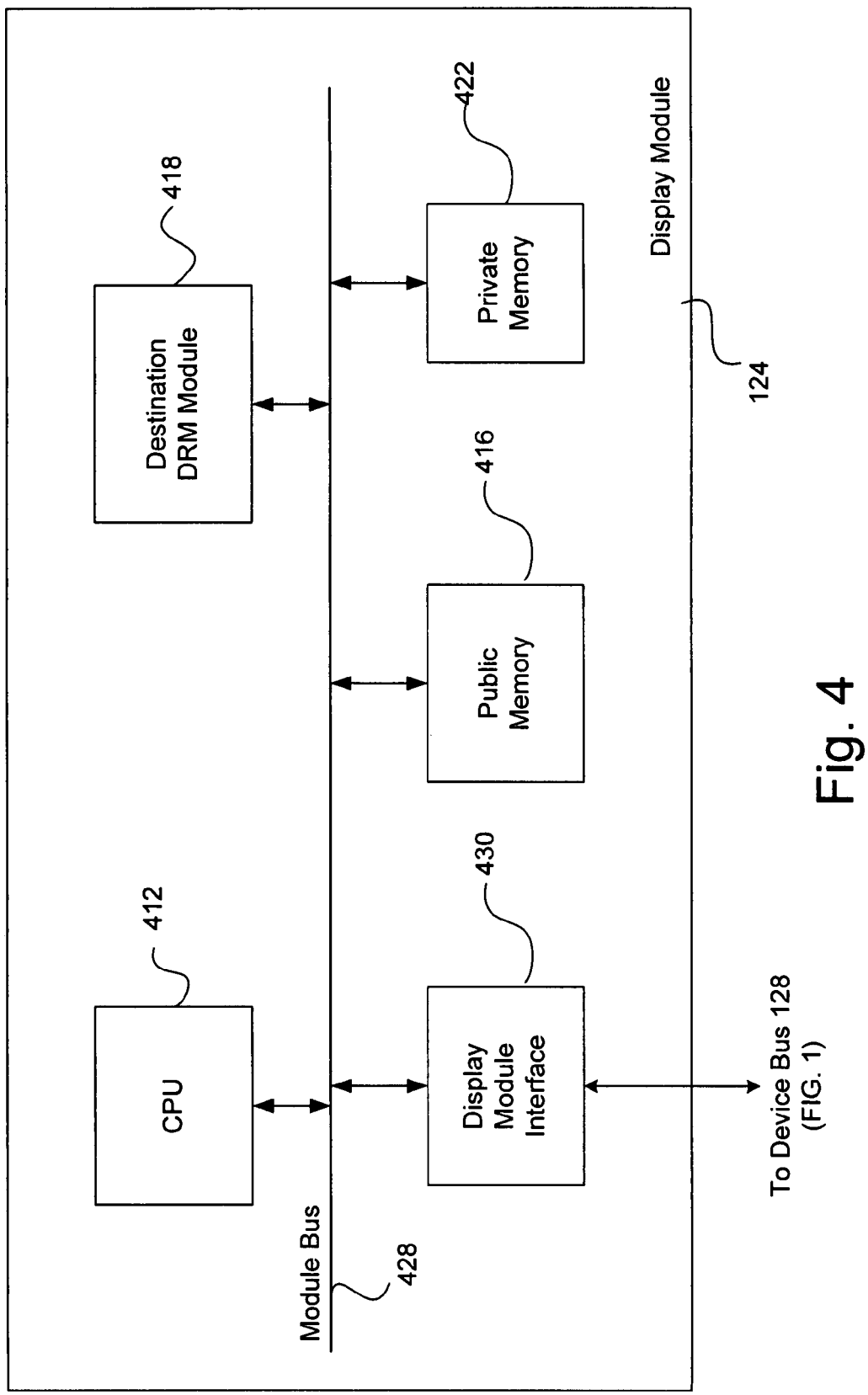
FIG. 4 is a block diagram for one embodiment of the display module of FIG. 1, in accordance with one embodiment of the present invention.

Referring now to FIG. 4, a block diagram of the FIG. 1 display module 124 is shown, in accordance with one embodiment of the present invention. In the FIG. 4 embodiment, display module 124 includes, but is not limited to, a CPU 512, a public memory 516, a destination DRM module 418, and a private memory 422. In alternate embodiments, display module 124 may be implemented using components and configurations in addition to, or instead of, certain of those components and configurations discussed in conjunction with the FIG. 4 embodiment.

In the FIG. 4 embodiment, CPU 412 may be implemented to include any appropriate and compatible processor device that executes software instructions to control and manage the operations of display module 124. In the FIG. 4 embodiment, public memory 416 may be implemented to include any combination of desired storage devices, including, but not limited to, read-only memory (ROM), random-access memory (RAM), and various types of non-volatile memory. In the FIG. 4 embodiment, display module utilizes public memory 416 to store public information that may be accessed by any desired external entities. For example, electronic device 110 may access the contents of public memory 416 with application software 212, operating system 214, channel setup module 216, or content playback module 218 (FIG. 2).

In the FIG. 4 embodiment, display module 124 may advantageously utilize destination DRM module 418 to perform a content decryption procedure upon encrypted electronic content that has been transmitted from content drive 114 (FIG. 3). In the FIG. 4 embodiment, destination DRM module 418 may perform the content decryption procedure by utilizing any appropriate and effective decryption techniques or methods. For example, in certain embodiments, destination DRM module 418 utilizes one or more special content keys received from source DRM module 318 of content drive 114 (FIG. 3) to define specifically how the electronic content has been altered during the content encryption procedure initially performed by source DRM module 318.

In the FIG. 4 embodiment, private memory 422 may be implemented to include any combination of desired storage devices, including, but not limited to, read-only memory (ROM), random-access memory (RAM), and various types of non-volatile memory. In the FIG. 4 embodiment, display module 124 utilizes private memory 422 to securely store private information that may be accessed only by certain authorized external entities. For example, in the FIG. 4 embodiment, the contents of private memory 422 may not accessed by application software 212, operating system 214, channel setup module 216, or content playback module 218 of electronic device 110. In the FIG. 4 embodiment, display module 124 may utilize private memory 422 for performing the foregoing content decryption procedure. In the FIG. 4 embodiment, display module 124 may utilize display module interface 430 to bi-directionally communicate with device bus 128 of electronic device 110 (FIG. 1). Additional details for effectively utilizing destination DRM module 418 to securely protect transferred electronic content are further discussed below in conjunction with FIGS. 5 through 7B.

Figure 5:
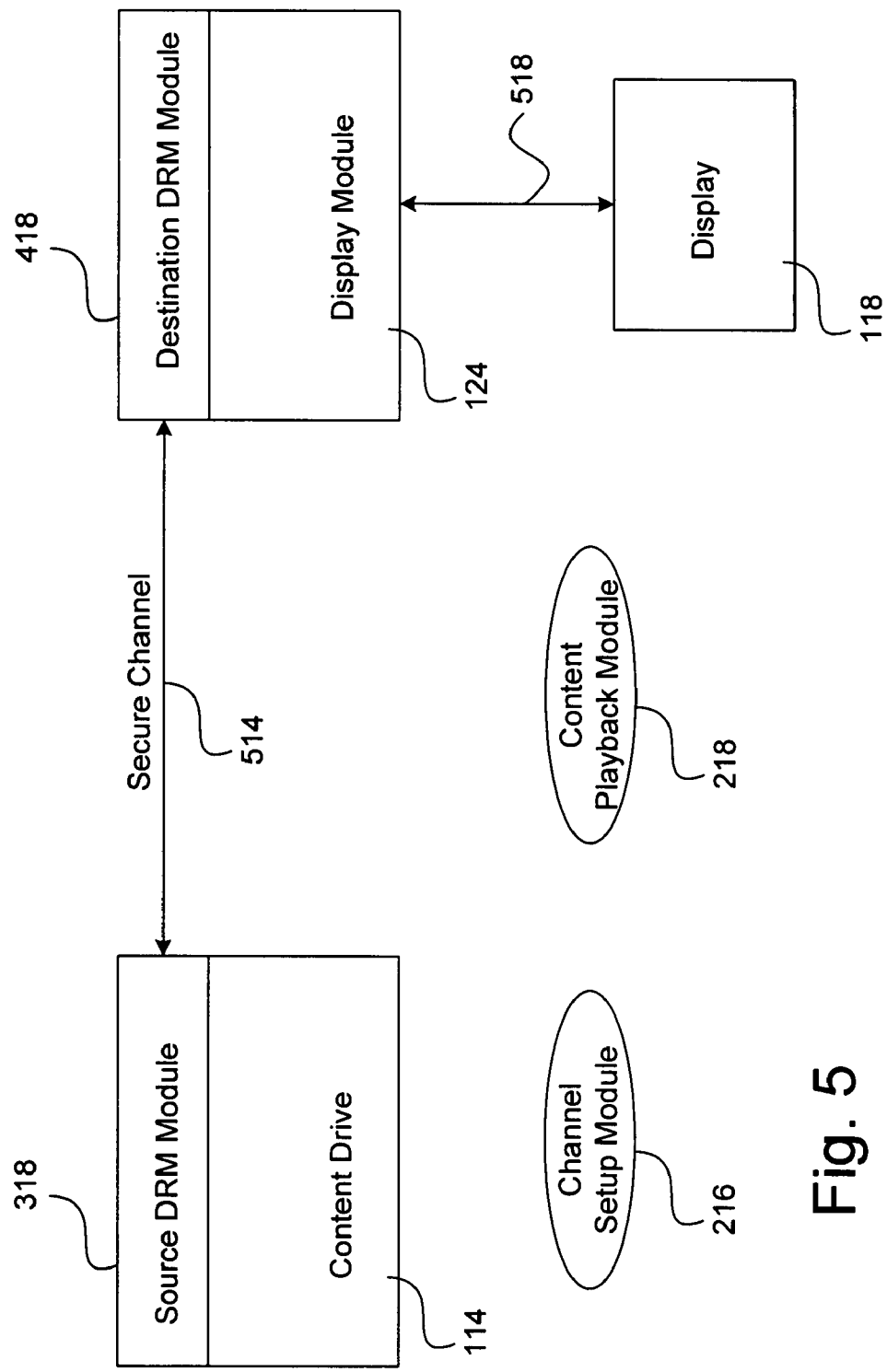
FIG. 5 is a block diagram illustrating a protected content utilization procedure, in accordance with one embodiment of the present invention.

Referring now to FIG. 5, a block diagram illustrating a protected content utilization procedure is shown, in accordance with one embodiment of the present invention. The FIG. 5 embodiment is presented for purposes of illustration, and in alternate embodiments, the present invention may protect content by utilizing techniques and configurations in addition to, or instead of, certain of those techniques and configurations discussed in conjunction with the FIG. 5 embodiment.

In the FIG. 5 embodiment, a channel setup module 216 and a content playback module 218 of an electronic device 110 (FIG. 1) may be implemented as software programs that utilize any appropriate and effective techniques, formats, or standards. For example, in certain embodiments, channel setup module 216 and content playback module 218 may be implemented as Open Source software programs that comply with a known Open Source standard that requires non-proprietary and public access to source code and other information from compliant software programs and corresponding host electronic devices. Alternately, channel setup module 216 and content playback module 218 may be implemented as proprietary commercial software programs that are not Open-Source compliant.

In Open Source embodiments, the present invention provides an effective method for securely and legally reproducing proprietary content from content drive 114 by utilizing Open Source versions of channel setup module 216 and content playback module 218. Alternately, in proprietary software embodiments, the present invention advantageously increases the protection level of the proprietary content during reproduction on electronic device 110. In the FIG. 5 embodiment, content drive 114 is beneficially modified to include a source DRM module 318 that encodes electronic content from content drive 114 by utilizing one or more special content keys that are unknown to either channel setup module 216 or content playback module 218. In certain embodiments, the original content may be encrypted/protected with some native Digital Rights Management scheme. The source DRM module 318 may then decrypt the original content, and then re-encrypt the content with the new special content key.

In the FIG. 5 embodiment, source DRM module 318 may utilize a secure channel 514 to share the special content key(s) with a destination DRM module 418 that is advantageously added to display module 124 in accordance with the present invention. Destination DRM module 418 may then receive and decrypt the content transferred from content drive 114 over secure channel 514 without either channel setup module 216 or content playback module 218 having the ability to access the transferred content in an unencrypted state (in-the-clear).

In the FIG. 5 embodiment, source DRM module 318 may also advantageously provide any required metadata that is associated with the content on content drive 114 to content playback module 218 in an unencrypted state (in-the-clear) to facilitate supporting any special functionalities associated with reproducing the content on the host electronic device 110. The foregoing metadata may include any appropriate types of information to support any desired functionalities. For example, metadata may include, but is not limited to, information to support various types of trick modes, fast forwarding, fast rewinding, chapter switching, actor-related information, special templates, backgrounds, scene information, text generation, and graphics, etc.

In the FIG. 5 embodiment, a system user may initially select content drive 114 for reproducing proprietary content upon a display 118 of electronic device 110 (FIG. 1). As discussed above, content playback module 218 of electronic device 110 may read metadata that is provided in an unencrypted state (in-the-clear) by source DRM module 318 of the content drive 114. The channel setup module 216 then performs a secure channel setup procedure to create a secure channel 514 between content drive 114 and display module 124 by utilizing any appropriate and effective techniques. In certain embodiments, the secure channel setup procedure may include a known Diffie-Hellman exchange procedure in which several initial identification keys are exchanged in appropriate handshaking procedures to identify both content drive 114 and display module 124 to each other.

In certain embodiments, source DRM module 318 may request an electronic identification certificate from destination DRM module 418 to validate the identity and characteristics of display module 124. In accordance with the present invention, after secure channel 514 is opened and the electronic identification certificate of display module 124 is validated, source DRM module 318 may then generate and send one or more unique and private content keys to destination DRM module 418 for decoding content information transferred from content drive 114 during a current content transfer session.

In the FIG. 5 embodiment, source DRM module 318 may then encrypt the content information from content drive 114 with the content key(s) that were previously provided to destination DRM module 418 over secure channel 514. Content playback module 218 may next access content drive 114 to read and transfer the encrypted content to display module 124 over secure channel 514. In the FIG. 5 embodiment, destination DRM module 418 may responsively decrypt the received content with the content key(s) previously received from source DRM module 318 over secure channel 514. Display module 124 may then display the decrypted content in combination with any required metadata upon display 118. Various techniques for opening a secure channel 514 and securely reproducing content information from content drive 114 are further discussed below in conjunction with FIGS. 6A-6B and 7A-7B Referring now to FIGS. 6A and 6B, a flowchart of method steps for performing a secure channel setup procedure is shown, in accordance with one embodiment of the present invention. In alternate embodiments, the present invention may perform secure channel setup procedures by utilizing steps and sequences other than certain of those steps and sequences discussed in conjunction with the embodiment of FIGS. 6A and 6B.

Figure 6A:
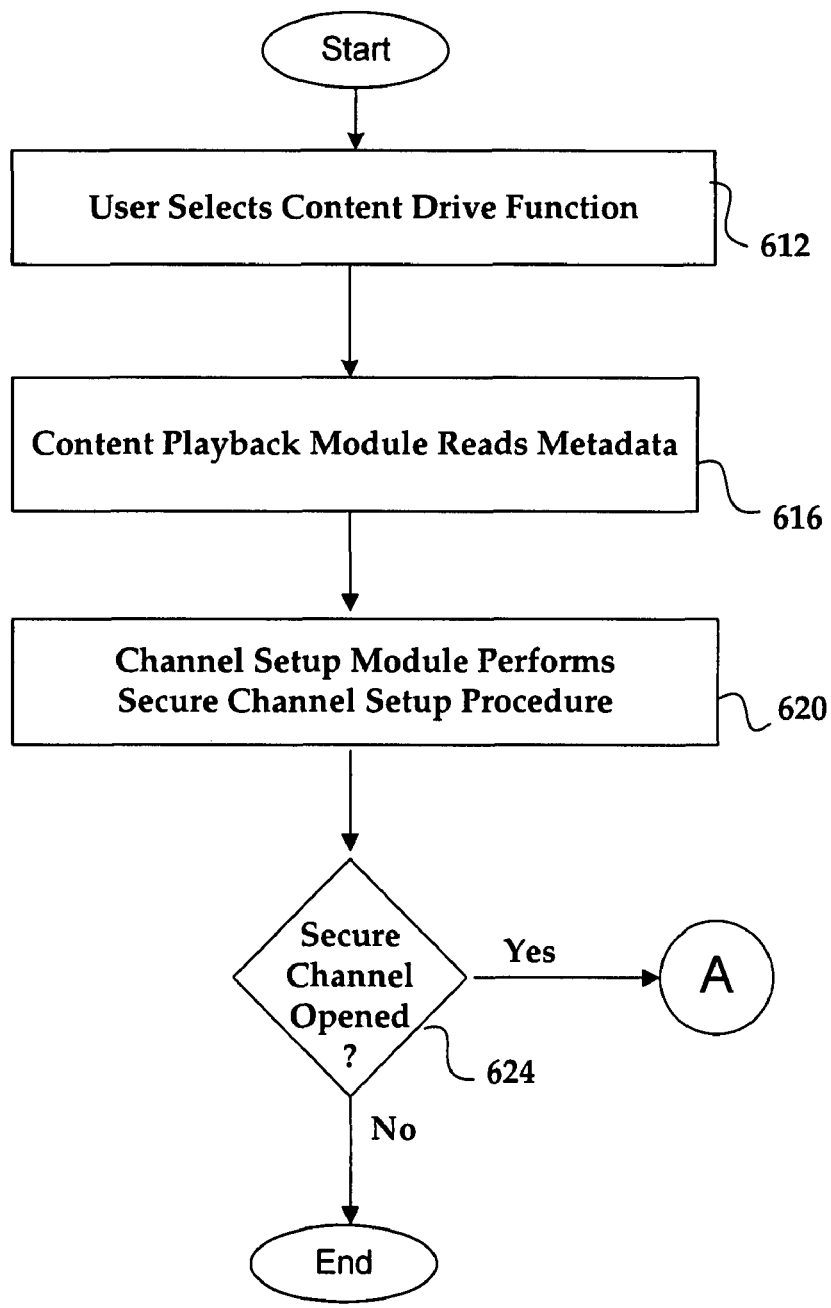
FIGS. 6A and 6B are a flowchart of method steps for performing a secure channel setup procedure, in accordance with one embodiment of the present invention.

In step 612 of FIG. 6A, a system user initially selects a content drive function for utilizing a content drive 114 (FIG. 1) to reproduce proprietary content upon a display 118 of an electronic device 110 (FIG. 1). In step 616, a content playback module 218 of the electronic device 110 reads metadata that is provided in an unencrypted state (in-the-clear) by a source DRM module 318 of the content drive 114. The metadata may include any appropriate type of information for supporting and enhancing the playback of the content upon display 118.

In step 620, a channel setup module 216 performs a secure channel setup procedure to create a secure channel 514 between content drive 114 and a display module 124 by utilizing any appropriate and effective techniques. In step 624, electronic device 110 determines whether a secure channel 514 (FIG. 5) has been successfully created. If a secure channel 514 is unable to be established, then the channel setup procedure may terminate. However, if a secure channel 514 has been opened, then the channel setup procedure advances to step 628 of FIG. 6B through connecting letter A.

Figure 6B:
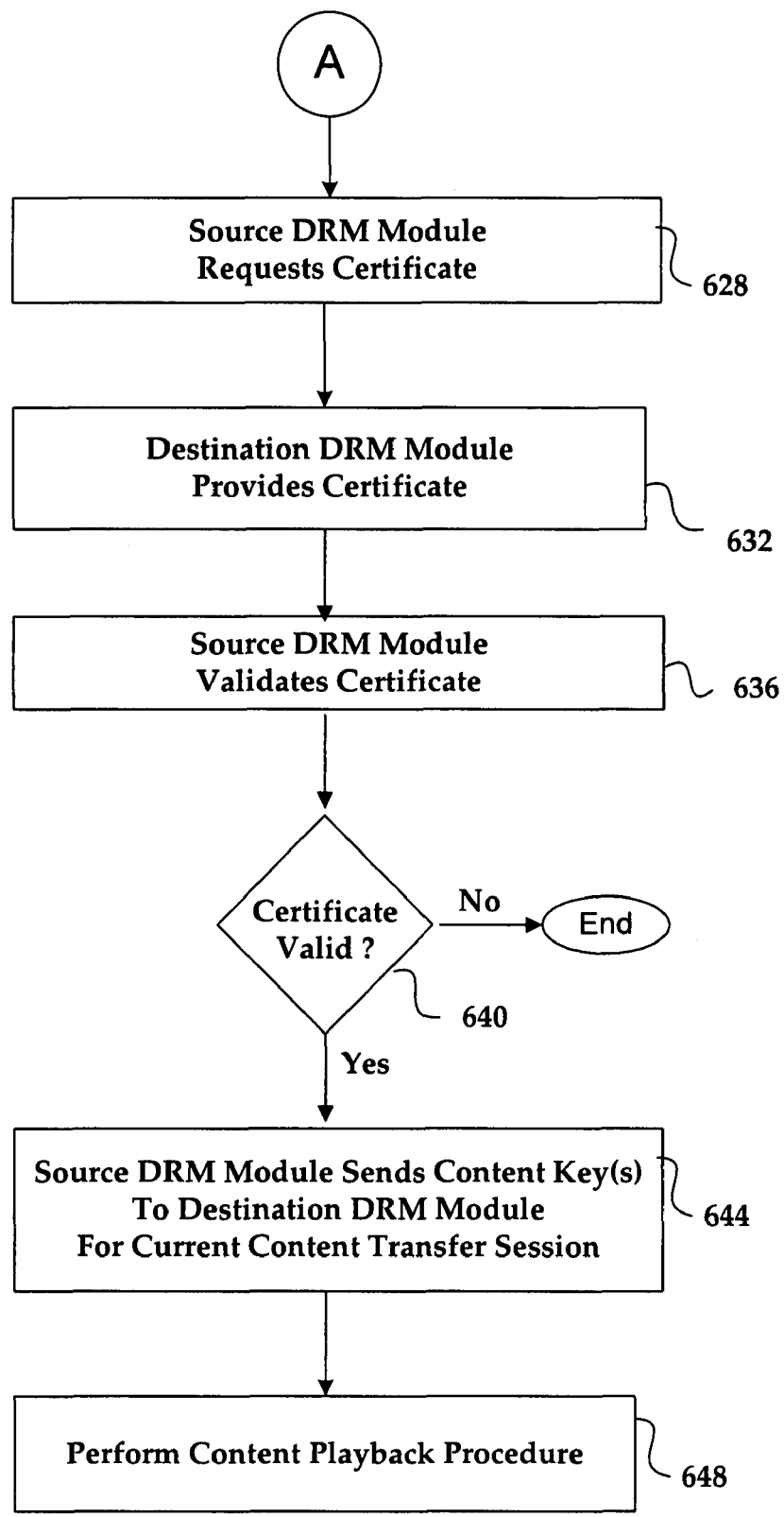

In step 628 of FIG. 6B, the source DRM module 318 requests an electronic identification certificate from a destination DRM module 418 of the display module 124 to validate the identity and characteristics of display module 124. In step 632, destination DRM module 418 responsively provides the electronic identification certificate to source DRM module 318. In step 636, source DRM module 318 then performs a certificate analysis procedure upon the electronic identification certificate from display module 124.

In step 640, source DRM module 318 determines whether the electronic identification certificate is valid. If the electronic identification certificate is not valid, then the secure channel setup procedure may terminate. However, if the electronic identification certificate is valid, then in step 644, source DRM module 318 generates and sends one or more unique and private content keys to destination DRM module 418 for decoding content information transferred from content drive 114 during a current content transfer session. In step 648, electronic device 110 may then perform a content playback procedure, as discussed below in conjunction with FIGS. 7A and 7B.

Figure 7A:
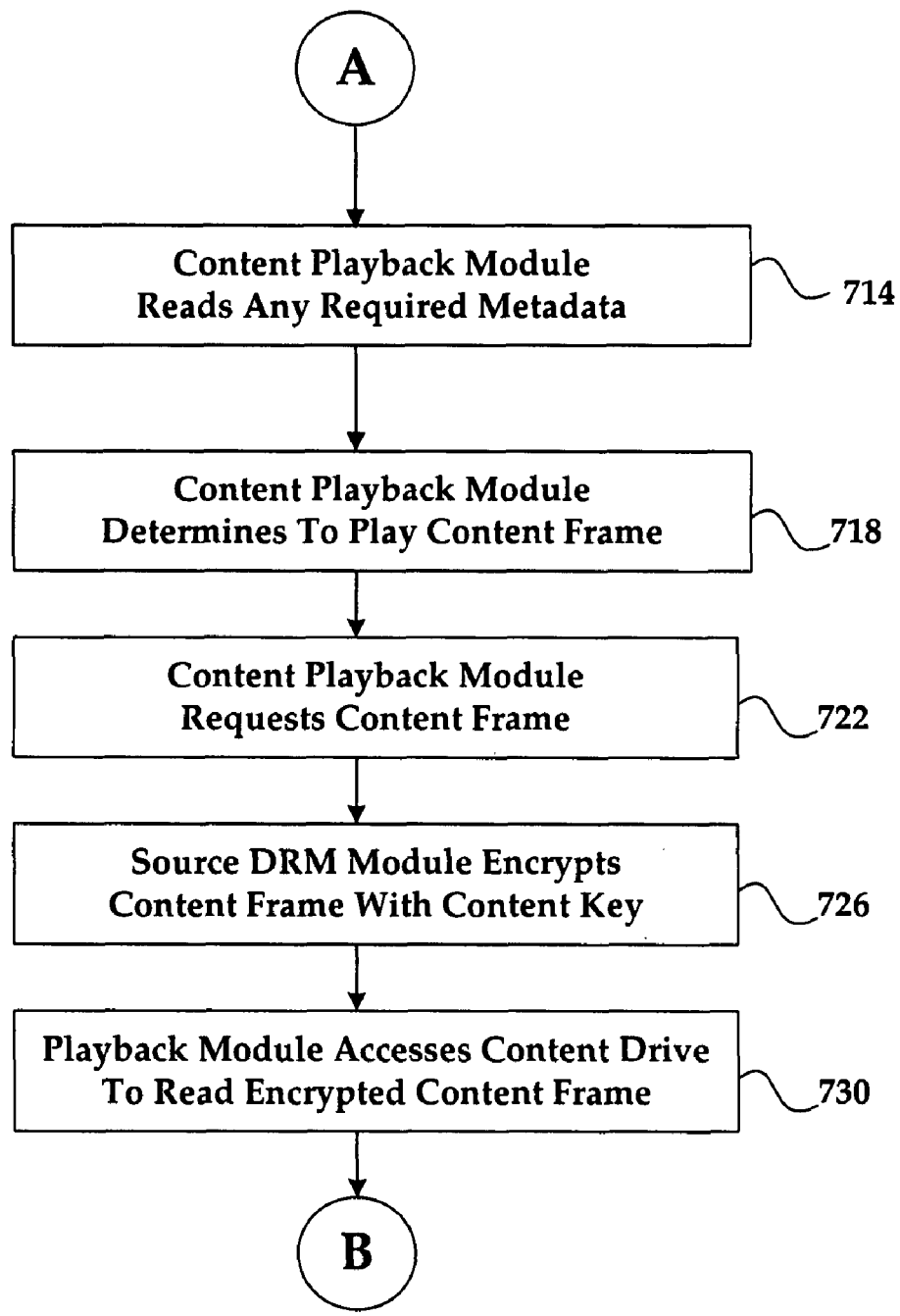
FIGS. 7A and 7B are a flowchart of method steps for performing a content playback procedure, in accordance with one embodiment of the present invention.
Figure 7B:
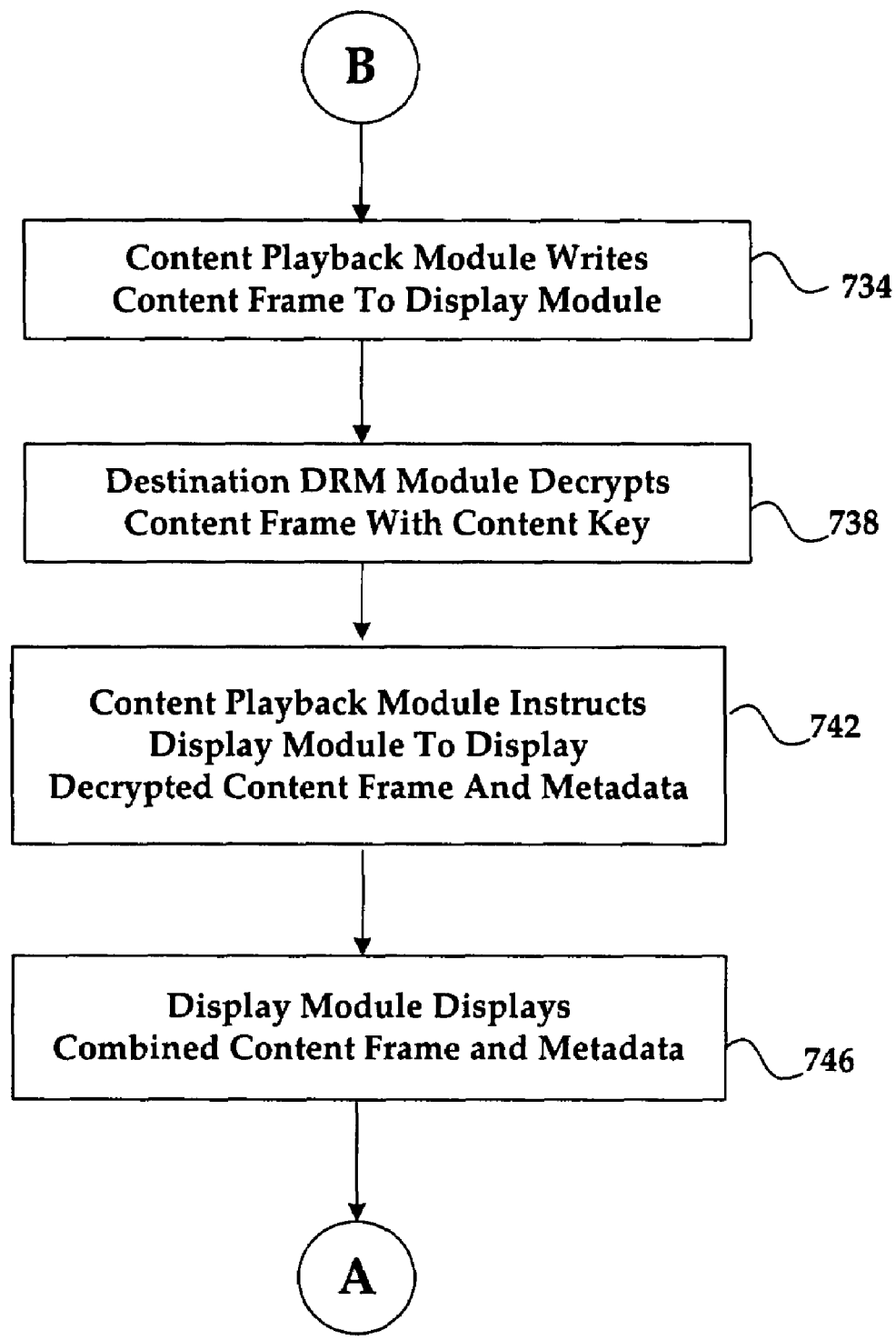

Referring now to FIGS. 7A and 7B, a flowchart of method steps for performing a content playback procedure is shown, in accordance with one embodiment of the present invention.

In alternate embodiments, the present invention may perform content playback procedures by utilizing steps and sequences other than certain of those steps and sequences discussed in conjunction with the embodiment of FIGS. 7A and 7B.

In step 714 of FIG. 7A, a content playback module 218 of electronic device 110 (FIG. 1) reads any required metadata in an unencrypted state (in-the-clear) from a source DRM module 318 of a content drive 114 (FIG. 3) for supporting the current content playback procedure. In step 718, content playback module 218 determines to play a content frame from content information on content drive 114. In step 722, content playback module 218 requests the content frame from content drive 114. In step 726, source DRM module 716 encrypts the requested content frame with one or more content keys that were previously provided to a destination DRM module 418 of a display module 124 over a secure channel (FIG. 5), as discussed above in conjunction with FIGS. 6A and 6B.

In step 730, content playback module 218 then accesses content drive 114 to read the encrypted content frame. The FIG. 7A process then advances to step 734 of FIG. 7B through connecting letter B. In step 734, content playback module 218 writes the encrypted content frame to display module 124. In step 738, destination DRM module 418 decrypts the received content frame with the content key(s) previously received from source DRM module 318 over secure channel 514. In step 742, content playback module 218 instructs display module 124 to display the decrypted content frame and any required metadata on a display 118 of electronic device 110 (FIG. 1).

In step 746, display module 124 then responsively displays the combined content frame and any metadata upon display 118. The FIG. 7B process may then repeatedly return to step 714 of FIG. 7A through connecting letter A for handling additional content frames from content drive 114 in a same or similar manner. For at least the foregoing reasons, the present invention therefore provides an improved system and method for effectively protecting electronic content information.

The invention has been explained above with reference to certain embodiments. Other embodiments will be apparent to those skilled in the art in light of this disclosure. For example, the present invention may readily be implemented using configurations and techniques other than certain of those described in the embodiments above. Additionally, the present invention may effectively be used in conjunction with systems other than certain of those described above. Therefore, these and other variations upon the discussed embodiments are intended to be covered by the present invention, which is limited only by the appended claims.

What is claimed is:

1. A machine-implemented method for effectively protecting electronic content, Comprising the steps of:
    coordinating a channel setup procedure with a channel setup module to create a secure communications channel;
    utilizing a source DRM module to generate and transmit a content key from a content drive to a display module over said secure communications channel, said source DRM module being solely responsible for generating and transmitting said content key without negotiations with any destination entity;
    initiating a content playback procedure with a content playback module for utilizing said electronic content, said source DRM module responsively encrypting said electronic content with said content key, said channel setup module and said content playback module being unable to access or utilize said content key; and
    receiving said electronic content with a destination DRM module over said secure communications channel, said destination DRM module utilizing said content key to decrypt said electronic content, said channel setup module and said content playback module being implemented as Open Source software programs that comply with an Open Source standard that requires non-proprietary and public access to source code and other information from said Open Source software programs and corresponding host electronic devices.

2. The machine-implemented method of claim 1 wherein utilizing said content key to encrypt and decrypt said electronic content in a manner that is not visible to said channel setup module and said content playback module allows securely and legally reproducing said electronic content from content drive by utilizing Open Source versions of said channel setup module and said content playback module.

3. A machine-implemented method for effectively protecting electronic content, comprising the steps of:
    coordinating a channel setup procedure with a channel setup module to create a secure communications channel;
    utilizing a source DRM module to generate and transmit a content key from a content drive to a display module over said secure communications channel, said source DRM module being solely responsible for generating and transmitting said content key without negotiations with any destination entity;
    initiating a content playback procedure with a content playback module for utilizing said electronic content, said source DRM module responsively encrypting said electronic content with said content key, said channel setup module and said content playback module being unable to access or utilize said content key; and
    receiving said electronic content with a destination DRM module over said secure communications channel, said destination DRM module utilizing said content key to decrypt said electronic content, wherein a device manufacturer implements said content drive with said source DRM module and said display module with said destination DRM module to support securely and legally reproducing said electronic content from content drive by utilizing Open Source versions of said channel setup module and said content playback module.

* * * * *